United States Patent
Bajekal et al.

(10) Patent No.: US 9,511,855 B2
(45) Date of Patent: Dec. 6, 2016

(54) POWER AND DATA TRANSFER TO HUB SENSORS

(71) Applicant: Sikorsky Aircraft Corporation, Stratford, CT (US)

(72) Inventors: Sanjay Bajekal, Simsbury, CT (US); Nicholas Charles Soldner, Southbury, CT (US); Zaffir A. Chaudhry, S. Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 383 days.

(21) Appl. No.: 14/161,323

(22) Filed: Jan. 22, 2014

(65) Prior Publication Data

US 2015/0203197 A1 Jul. 23, 2015

(51) Int. Cl.
*B64C 27/32* (2006.01)
*H02J 5/00* (2016.01)

(52) U.S. Cl.
CPC ............... *B64C 27/32* (2013.01); *H02J 5/005* (2013.01)

(58) Field of Classification Search
CPC ...................................................... H02J 5/005
USPC .......................................................... 307/104
See application file for complete search history.

(56) References Cited

U.S. PATENT DOCUMENTS

| | | | |
|---|---|---|---|
| 2,921,289 A * | 1/1960 | Eklund | G08C 17/04 244/17.11 |
| 6,535,133 B2 | 3/2003 | Gohara | |
| 7,649,283 B2 | 1/2010 | Tonn et al. | |
| 2010/0109445 A1 | 5/2010 | Kurs et al. | |
| 2010/0213929 A1 | 8/2010 | Gregg et al. | |
| 2011/0133950 A1 | 6/2011 | Subramanian et al. | |
| 2012/0068003 A1 | 3/2012 | Bajekal et al. | |
| 2013/0328410 A1 * | 12/2013 | Georgakopoulos | H01F 38/14 307/104 |

FOREIGN PATENT DOCUMENTS

GB 2037995 A 7/1980

OTHER PUBLICATIONS

International Search Report for application PCT/US15/12395, dated Apr. 14, 2015, 8 pages.
Written Opinion for application PCT/US15/12395, dated Apr. 14, 2015, 5 pages.
Kurs, Andre et al., "Wireless Power transfer via Strongly Coupled Magnetic Resonances", Science , vol. 317, Jul. 6, 2007, pp. 83-86.
Lee, Youbok, "Antenna circuit design for RFID applications", Microchip Technology, AN710, 2003, 50 pages.
Lee, Youbok, "Using the PIC16F639 MCU for Smart Wireless Applications", Microchip Technology, AN959, 2004, 10 pages.
Palacherla, Amar, "Using PWM to generate analog output", Microchip Technology, AN538. Sep. 22, 1995, 3 pages.

* cited by examiner

*Primary Examiner* — Robert Deberadinis
(74) *Attorney, Agent, or Firm* — Cantor Colburn LLP

(57) ABSTRACT

Embodiments are directed to a method comprising: providing, by a coil embedded in a structure of a rotor hub composed of a paramagnetic material, power to at least one sensor, and receiving, by the coil, data from the at least one sensor. Embodiments are directed to a system comprising: a coil embedded in a structure of a rotor hub composed of a paramagnetic material, and a plurality of sensors communicatively coupled to the coil and configured to receive power from the coil.

19 Claims, 5 Drawing Sheets

POWER AND DATA TRANSFER TO HUB SENSORS

BACKGROUND

The rotor of a rotating wing aircraft is the main load bearing structure and consequently faces different kinds of stresses during a flight profile. Sensors may be added to a rotor hub for purposes of health monitoring, with a view towards condition-based maintenance (CBM).

Sensors on the rotor hub need power in order to: (1) sense the data, and (2) communicate sensed data to a processing unit where it is collated and processed into information needed for CBM or diagnostics, prognostics, and health management (DPHM). Providing power is a challenge due to at least two factors: (1) use of batteries as a power source being impractical due to the finite life of the battery and a lack of serviceable access to replace worn batteries, and (2) using of wiring harnesses being unreliable due to stresses and environmental conditions. Similarly, communications with sensors on the hub is challenging for at least two reasons: (1) wiring harnesses (or a lack thereof) for traditional wired communications, and (2) E-field interference from electro-magnetic (EM) sources on the aircraft and intentional jammers for traditional wireless communications.

BRIEF DESCRIPTION OF THE INVENTION

Embodiments are directed to a method comprising: providing, by a coil embedded in a structure of a rotor hub composed of a paramagnetic material, power to at least one sensor, and receiving, by the coil, data from the at least one sensor.

Embodiments are directed to a system comprising: a coil embedded in a structure of a rotor hub composed of a paramagnetic material, and a plurality of sensors communicatively coupled to the coil and configured to receive power from the coil.

Additional embodiments are described below.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
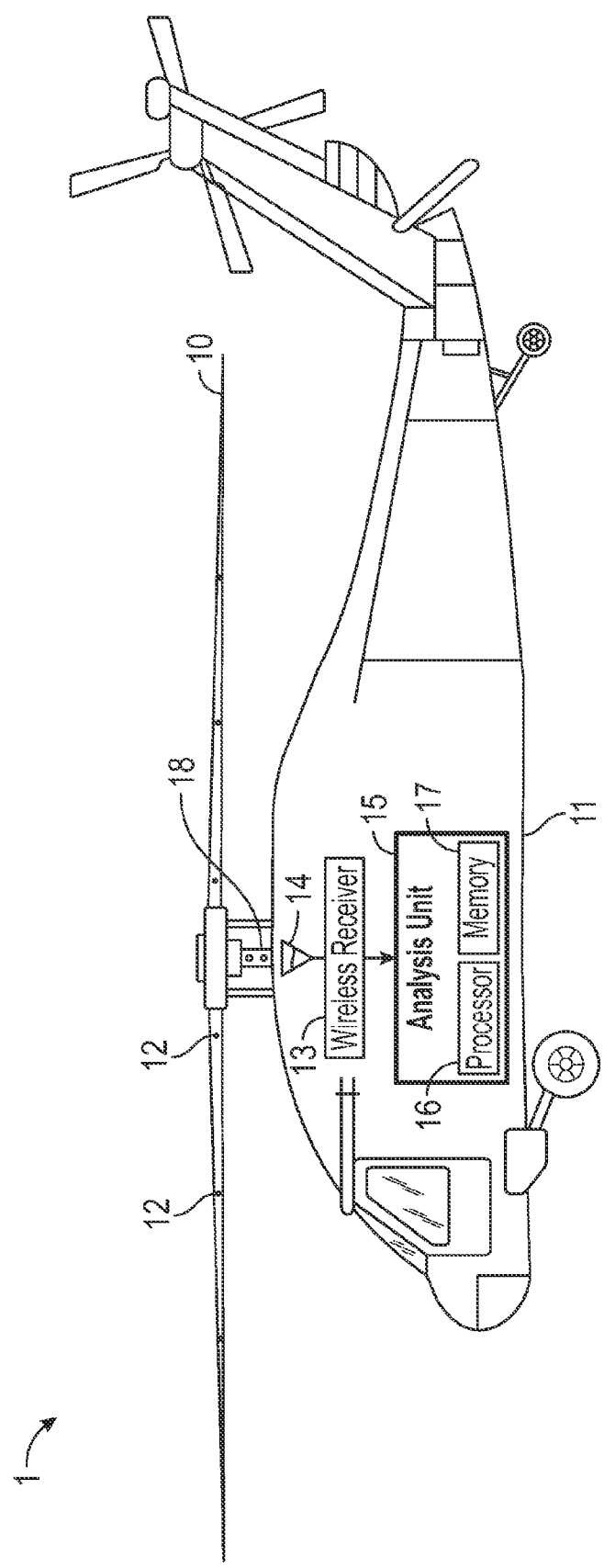
FIG. 1 is a diagram of a rotorcraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for enabling wireless power and data transfer capability to sensors embedded in a hub of a rotating wing aircraft. The aircraft may operate in harsh environments for extended periods of time without the need for battery replacement over the lifetime of one or more products. In some embodiments, a rotor head or hub may be fabricated out of one or more materials, such as titanium. The titanium may serve or function as a paramagnetic material, much like an air gap in connection with wireless transmissions. In this respect, communication (e.g., a power transfer) might not be subjected to multipath conditions.

In some embodiments, variations in bulk manufacturing techniques may be identified in connection with center frequencies of coils. A 'Q-factor' may be derived and utilized to optimize a frequency division multiplexing (EDM) technique, thereby maximizing performance or efficiency of data transfer.

FIG. 1 illustrates a system 1 in accordance with one or more embodiments. The system 1 includes a plurality of sensors 12 in the rotor blades 10 and the rotor shaft 18. The sensors 12 may include wireless transmitters to transmit data wirelessly to an antenna 14 and receiver 13. The sensors 12 may include, for example, strain gauges, magnetic Hall Effect sensors, temperature sensors, pressure sensors, magnetorestrictive sensors, accelerometers, and rate gyros. The sensors 12 may monitor the rotor blades 10 and shaft 18 to sense the loads and motion of the blades 10 and shaft 18, and the effect of perturbations in the aircraft state on the blades 10 and shaft 18. Perturbations in aircraft state may result in changes in the loads and motion of the blades 10 and shaft 18 including changes in blade flap, blade pitch, blade lead lag, main rotor shaft bending, main rotor shaft torque, and pitch rod loads, for example.

In exemplary embodiments, the wireless signals output from the sensors 12 are low-power wireless signals to prevent interference with control systems of the helicopter or to prevent detection of the helicopter from external sensors, such as ground-based receivers or receivers of other aircraft.

The receiver 13 transmits the sensed rotor data to an analysis unit 15, which includes a processor 16 to process the sensed data to replace and correct lost and erroneous data to accurately determine the loads and motion of the rotor blades 10. The analysis unit 15 may further include memory 17, supporting logic, and other circuitry necessary to analyze the sensor data and store and transmit the analyzed data. Examples of memory and supporting logic include hard disks, flash memory, volatile and non-volatile memory, field programmable gate arrays, multiplexers, and other memory and logic circuitry. According to some embodiments, the analysis unit 15 is located within the body 11 of the helicopter. According to some embodiments, the analysis unit 15 is external to the helicopter. For example, the wireless receiver 13 may include a wireless transmitter, and the wireless transmitter may transmit the sensor data to an external analysis unit.

The system 1 is illustrative. In some embodiments, alternative forms or types of aircraft configuration may be used without departing from the scope and spirit of this disclosure.

Figure 2:
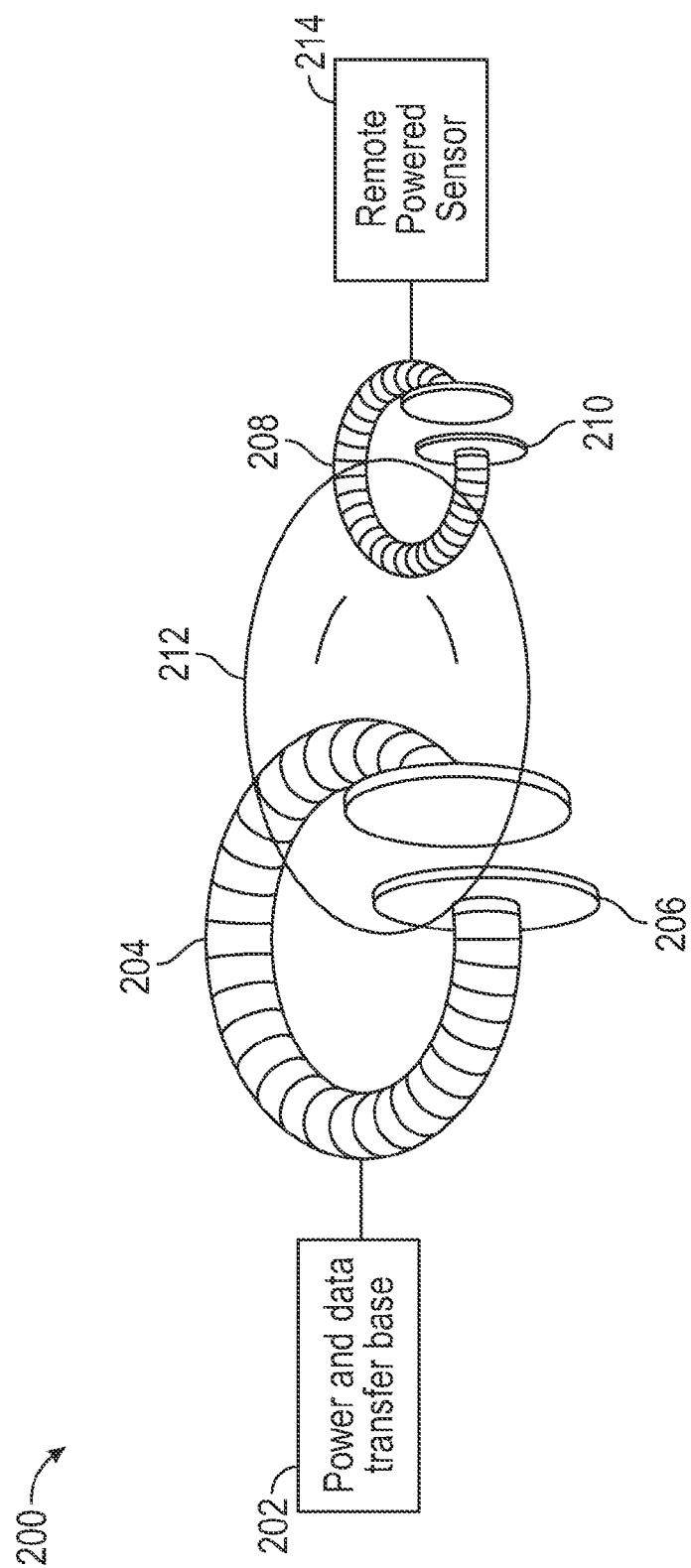
FIG. 2 is a diagram of system for transferring power and data.

Referring to FIG. 2, a system 200 for transferring power and/or data in accordance with one or more embodiments is shown. In some embodiments, the system 200 may be associated with one or more of the components or devices shown and described above in connection with the system 1 of FIG. 1. For example, the system 200 may be associated with one or more of the sensors 12, the antenna 14, the receiver 13, and the analysis unit 15.

The power and data transfer base 202 may represent the origin of power or data in the system 200. Power and data may be conveyed from the base 202 to a device or structure that includes an inductor coil 204 and a capacitance plate 206. The power and data may be transmitted to a second structure or device that includes an inductor coil 208 and a capacitance plate 210. The transmission may occur over an air gap 212 that may provide a path for magnetic lines of flux. In this regard the transmission between the first and second structure may be analogous to a magnetic coupling between primary and secondary coils associated with a transformer, wherein a typical laminated iron core has been replaced by the air gap 212. The power and data may be conveyed from the second structure to a remote power and data sensor 214, wherein the power and data may be consumed or processed.

In some embodiments, technology used for data transfer between sensors used in, e.g., health monitoring may adhere to one or more techniques. For example, any commercial or proprietary protocol (e.g., wired protocol), such as RS-232, $I^2C$, and Ethernet may be used. In some embodiments, any commercial E-field wireless protocol, such as IEEE 802.15.4, IEEE 802.11x, etc., may be used.

Figure 3:
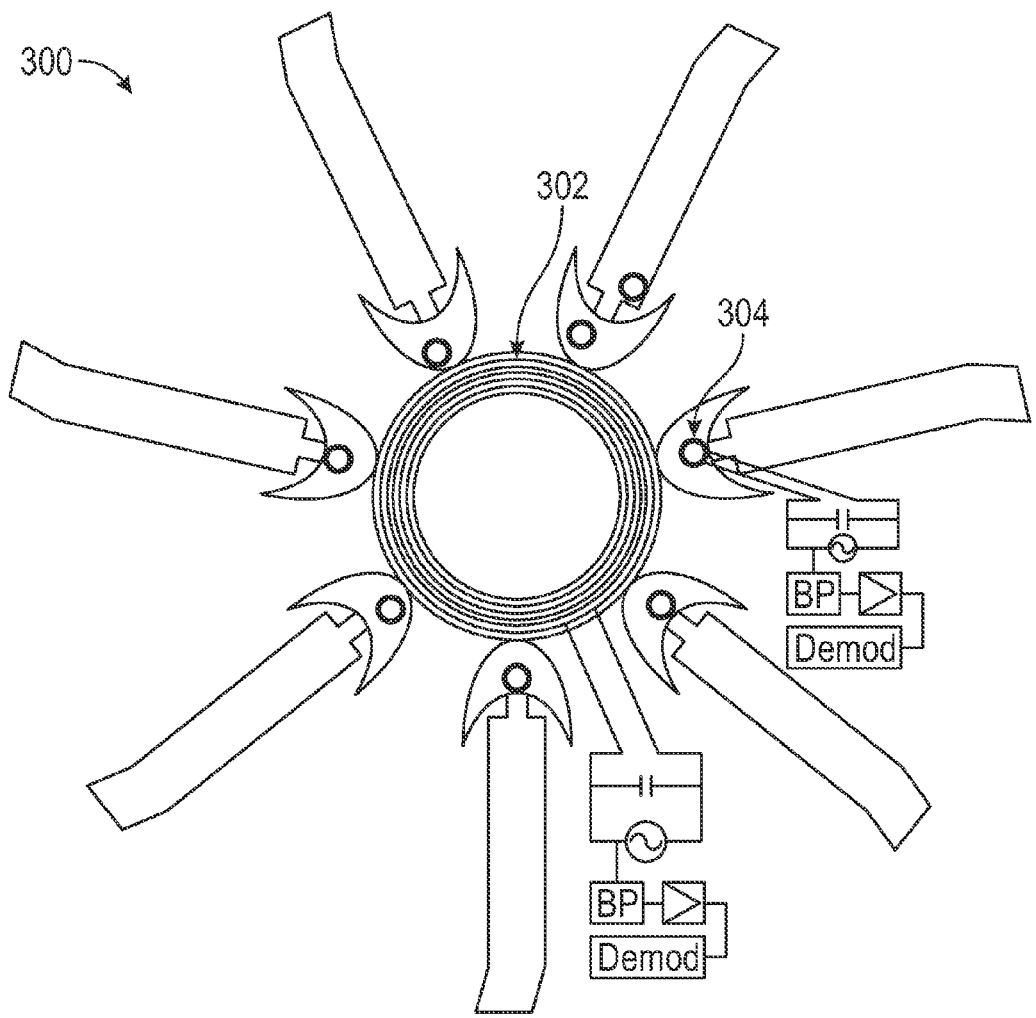
FIG. 3 is a diagram of a system demonstrating placement of one or more loops for transferring power and data.

Referring to FIG. 3, a system 300 used for power and data transfer on a hub is shown. The system 300 may include a primary coil, denoted as a gateway loop 302 in FIG. 3. The gateway loop 302 may be embedded in the main structure of a rotor hub and may include processing circuitry. The primary coil/gateway loop 302 may provide power to one or more sensors (e.g., passive sensors) or actuators, denoted as sensor loop 304 in FIG. 3. The primary coil 302 may receive data transmitted by the sensors 304. Data that has been successfully demodulated can be transferred to an avionics bay using one or more techniques. The system 300 may be used to transfer power over distances of up to, e.g., 2 meters.

The physical layer in H-field communications may incorporate aspects of pulse width modulation (PWM). PWM may work well for low data rates and single wireless links. The typical 3 dB bandwidth for H-field communications may be on the order of 4 KHz. For applications in rotating wing aircraft, this bandwidth may be inadequate due to a large number of sensors (e.g., one-hundred discrete sensor units) that may be used. In this respect, frequency division multiplexing (FDM) techniques may be used in a narrow channel, and may be scaled to accommodate a large number of sensors.

Figure 4:
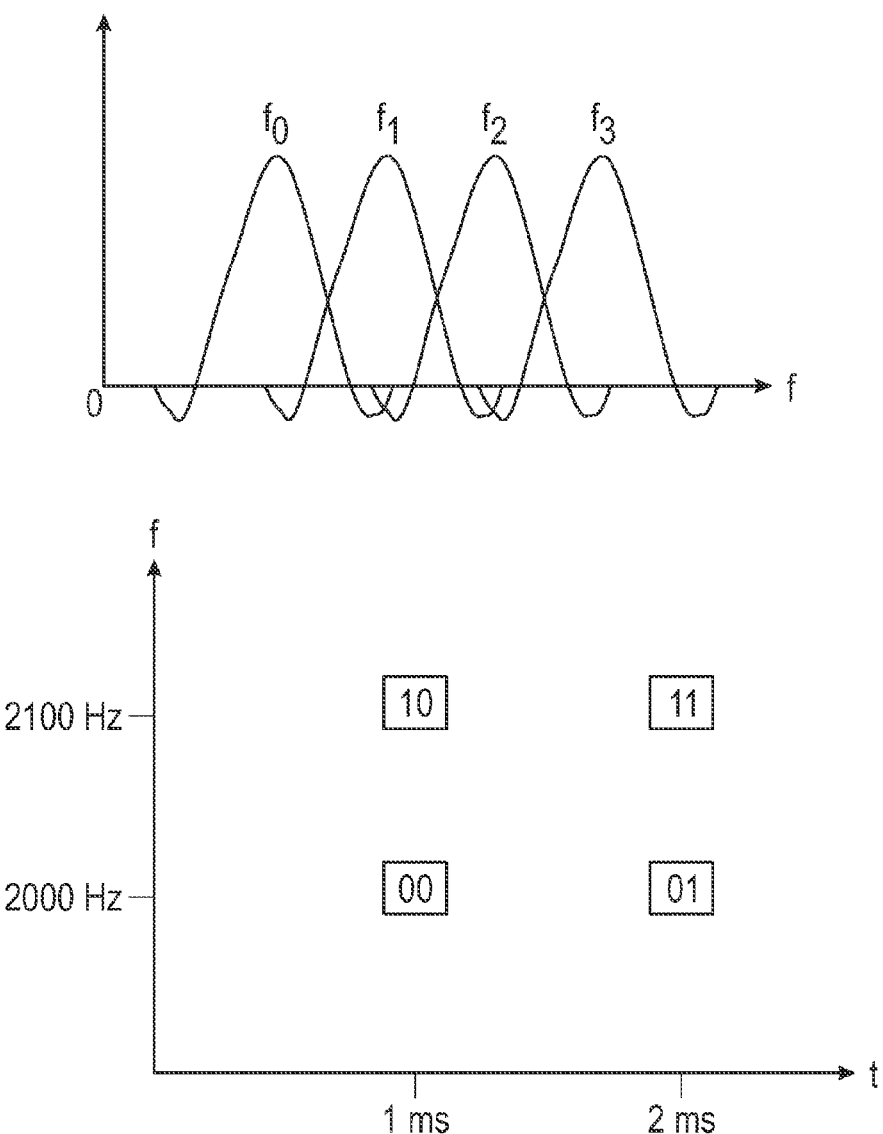
FIG. 4 is a diagram illustrating a transfer of data.

Bulk manufacturing and installation variation techniques may be used to accommodate the large number of sensors. These variations may be captured after installation has occurred and classifications may be adopted to identify a specific center frequency shift of the Q-factor of each individual coil. This may be detected as the designed 3 dB bandwidth is known. Once the individual center frequencies have been quantified, a FDM scheme or algorithm may be used along with PWM to achieve a high data bandwidth. FIG. 4 represents an example, wherein four frequencies, denoted as $f_0$, $f_1$, $f_2$, and $f_3$, are shown as being associated with pairs of data, center frequency (in Hertz), and pulse width (in milliseconds) as follows, respectively:

$f_0$: (00, 2000, 1)
$f_1$: (01, 2000, 2)
$f_2$: (10, 2100, 1)
$f_3$: (11, 2100, 2).

The values used in connection with FIG. 4 are illustrative. In some embodiments, different values may be used or present.

Figure 5:
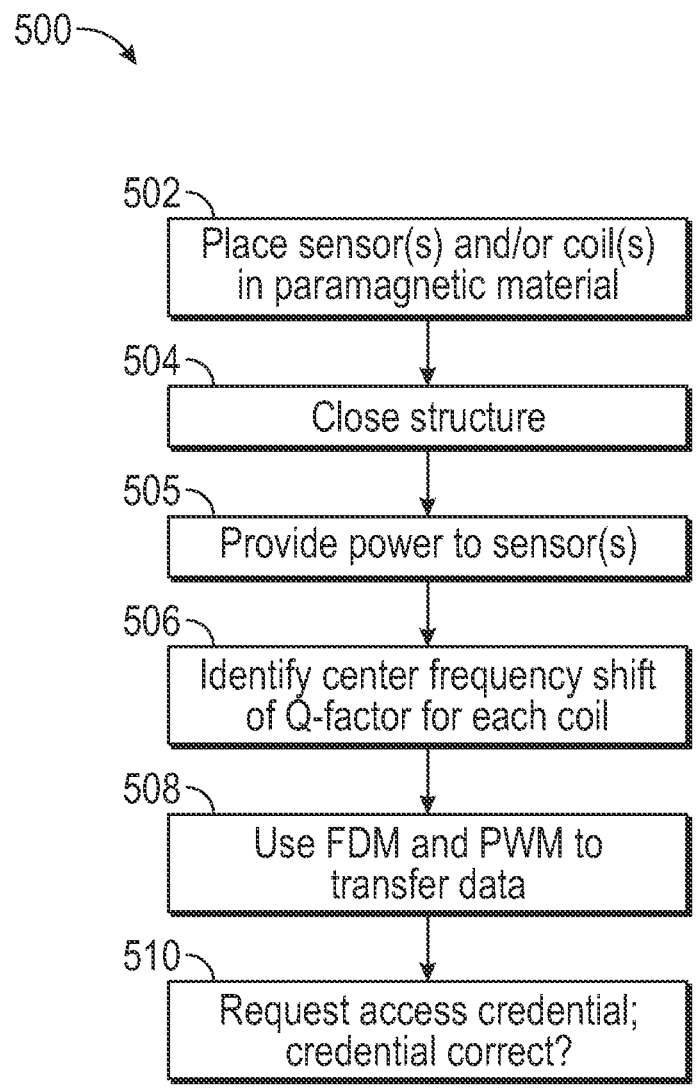
FIG. 5 is a flow chart of an exemplary method.

Turning to FIG. 5, a flow chart of an exemplary method 500 is shown. The method 500 may execute in connection with one or more components, devices, or systems, such as those described herein. The method 500 may be used to enable wireless power and data transfer capability to sensors embedded in the hub of a rotating wing aircraft.

In block 502, one or more sensors (e.g., wireless sensors) or coils may be placed or embedded in a paramagnetic material, such as titanium. As an example, a primary coil may be embedded in a main structure of a rotor hub with processing circuitry. The primary coil may provide power to passive sensors and actuators and may serve as a receiver for data transmitted by sensors.

As part of block 502, the sensors or coils may be placed within a common structure. In some embodiments, a coil may be placed in a first structure and sensors may be placed in one or more additional structures; a small air gap may be present between the first structure and the additional structure(s).

In block 504, the structure(s) may be coated or sealed following the inclusion of the sensors or coils. In some embodiments, the structure(s) may be built around the sensors or coils using additive manufacturing techniques.

In block 505, power may be provided by a coil to the sensors.

In block 506, a center frequency shift of the Q-factor for each individual coil may be identified.

In block 508, a FDM technique in combination with a PWM technique may be used to obtain a high data bandwidth for data transfer.

In block 510, a request for an access credential may be received. If the credential is correct or validated/authenticated, one or more methodological acts, such as those described herein or above, may be enabled. Block 510 may optionally be used in some embodiments to provide for secure access or function with respect to one or more resources.

The method 500 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown.

Embodiments of the disclosure may be used to provide for scalable capability without a need for upgrading an installed wiring harness. A new sensor may be added with a small power/data transfer coil.

Embodiments of the disclosure may provide for a secure network. For example, a magnetic field or H-field may decay at a rate of 60 dB/decade, as compared to 20 dB/decade for an electric field or E-field. As such, use of the H-field for communications may provide protection against jamming or eavesdropping.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   providing, by a coil embedded in a structure of a rotor hub composed of a paramagnetic material, power to at least one sensor; and
   receiving, by the coil, data from the at least one sensor.
2. The method of claim 1, wherein the paramagnetic material comprises titanium.
3. The method of claim 1, further comprising:
   demodulating the received data; and
   transferring the demodulated data to an avionics bay.
4. The method of claim 1, wherein the power is provided to the at least one sensor over a distance of at least 2 meters.
5. The method of claim 1, wherein the at least one sensor is embedded in the structure.
6. The method of claim 1, wherein the at least one sensor is embedded in a second structure, and wherein an air gap is present between the structure and the second structure.
7. The method of claim 1, wherein the structure is built around the coil using an additive manufacturing technique.
8. The method of claim 1, further comprising:
   identifying a center frequency shift of a Q-factor for a second coil associated with the at least one sensor.
9. The method of claim 8, further comprising:
   using, by the coil, a frequency division multiplexing (FDM) technique with pulse width modulation (PWM) to receive the data based on the center frequency shift of the Q-factor for the second coil.
10. A system comprising:
    a coil embedded in a structure of a rotor hub composed of a paramagnetic material; and
    a plurality of sensors communicatively coupled to the coil and configured to receive power from the coil.
11. The system of claim 10, wherein the paramagnetic material comprises titanium.
12. The system of claim 10, further comprising:
    circuitry embedded in the structure configured to:
       demodulate data received by the coil from the sensors; and
       cause the demodulated data to be transferred to an avionics bay.
13. The system of claim 10, wherein the power is received by at least one of the sensors over a distance of approximately 2 meters.
14. The system of claim 10, wherein at least one of the sensors is embedded in the structure.
15. The system of claim 10, wherein at least one of the sensors is embedded in a second structure composed of a second paramagnetic material, and wherein an air gap is present between the structure and the second structure.
16. The system of claim 15, wherein the paramagnetic material and the second paramagnetic material are different.
17. The system of claim 10, wherein the structure is configured to be built around the coil using an additive manufacturing technique.
18. The system of claim 10, wherein the structure is configured to be coated or sealed following the inclusion of the coil.
19. The system of claim 10, wherein the coil is configured to receive data from the sensors using a frequency division multiplexing (FDM) technique combined with pulse width modulation (PWM) based on an identification of a center frequency shift of a Q-factor for each of a plurality of coils that are associated with a respective one of the plurality of sensors.

* * * * *